United States Patent [19]
Nakamura

[11] 3,981,719
[45] Sept. 21, 1976

[54] METHOD FOR RECEIVING MOLTEN STEEL FROM AN ELECTRIC FURNACE

[75] Inventor: Shoji Nakamura, Osaka, Japan

[73] Assignee: Kyoei Steel Works, Ltd., Osaka, Japan

[22] Filed: July 8, 1975

[21] Appl. No.: 594,072

[52] U.S. Cl. ................................... 75/13
[51] Int. Cl.² ................................ C21C 5/52
[58] Field of Search ................ 75/13; 266/13

[56] References Cited
UNITED STATES PATENTS

| | | | |
|---|---|---|---|
| 1,318,164 | 10/1919 | McConnell | 75/13 |
| 3,434,705 | 3/1969 | Pere | 266/13 |
| 3,502,313 | 3/1970 | Pastorius | 266/13 |
| 3,761,242 | 9/1973 | Finkl | 75/13 |
| 3,782,596 | 1/1974 | Griffiths | 222/1 |

*Primary Examiner*—M. J. Andrews
*Attorney, Agent, or Firm*—Wenderoth, Lind & Ponack

[57] ABSTRACT

A method for receiving molten steel from an electric furnace without using a ladle crane in tapping, comprising a ladle bogie on rails supporting thereon a ladle which can be tilted when receiving molten steel therein; a ladle preheating device installed at the position which does not interfere with molten steel receiving work of the ladle bogie; and an electric furnace having a short tapping trough for reducing the lowering of molten steel temperature while molten steel is being received.

1 Claim, 5 Drawing Figures

METHOD FOR RECEIVING MOLTEN STEEL FROM AN ELECTRIC FURNACE

This invention relates to a new method for receiving molten metal into a ladle from an electric furnace.

Conventionally, molten steel is poured from an electric furnace into a ladle in such a way as shown in FIG. 1A and FIG. 1B, and more particularly, an electric furnace 1 having a tapping trough 2 and long electrodes 3 is installed on a rocker 10 of an electric furnace foundation 13 and a slag pit 11 is provided below the level of a work floor 9 at the rear of the electric furnace. Provided in front of the electric furnace is a deep ladle pit 8, above which a crane 7 for operating a ladle 4 is arranged. A hook 5 is suspended from the crane by a wire 6. A trunnion shaft (center shaft) of the ladle is caught with the hook 5, whereby the ladle is suspended. In receiving molten steel, while the electric furnace is tilted as shown by 1b in FIG. 1B from its original position as shown by 1a in FIG. 1A, the suspended ladle is lowered to receive molten steel as shown in FIG. 1B. This method, however, has the following disadvantages.

In the conventional method, it takes 5 – 10 minutes for the ladle to get fully prepared for receiving molten steel after pre-drying, during which time the temperature of preheated fireproof material in the ladle lowers.

Taking the above-mentioned lowering of temperature into consideration, sometimes the tapping temperature of the electric furnace is set at 1,600°C at the lowest, or about 100° – 150°C raising than usual. However, higher tapping temperatures result in reduction of the life of the fireproof material in the electric furnace and involve the danger of molten steel in the furnace boiling and spouting out of the furnace.

It takes more time for steel making and involves more consumption of electric power to set the tapping temperature higher than usual.

While molten steel is being received, a craneman finds it difficult to operate the crane due to smoke and flames rising from the ladle. Besides, the crane and electric equipment are liable to be damaged and broken due to rising hot air.

When receiving molten steel, it is a usual practice to tilt the electric furnace and to pour the molten steel from its tapping hole into the ladle. In this case, the tip of the tapping hole lowers frontward in relation to a furnace center G, tracing the arcuate locus, in proportion to the tilting of the furnace. Accordingly, a craneman is required to manipulate the ladle crane in such a fashion as to facilitate receiving of the molten steel, for which skill of a high standard is necessary.

In connection with the operation by the craneman as mentioned above, if electrodes of the electric furnace are very long, the wire and the hook of the ladle crane will make contact with the electrodes 3 when the furnace is at its maximum degree of tilting, thus making it impossible to receive molten metal. Accordingly, it is necessary to set the electrodes shorter in length, but this involves such disadvantages as the necessary increase in frequency of electrode replacement.

In the conventional system, a material yard and a tapping yard are in different buildings. The electric furnace is located in the material yard and when the molten steel is received in the tapping yard by tilting the furnace and by operating the ladle crane, the tapping trough of the electric furnace must be longer. A larger length of the tapping trough means that it takes more time for the flow of molten steel to pass through the tapping trough whose fireproof material is of nearly normal temperature. This involves the lowering of the tapping temperature and a consequent lowering of the temperature inside the ladle. In order to prevent this loss of heat, it is a usual practice to make the temperature inside the furnace higher by the temperature equivalent to such loss of heat. This, however, requires extra energy and results in damaging the furnace material. Fireproof material of a longer tapping trough also wear to a greater extent.

The present invention has for an object to eliminate the above-mentioned disadvantages. According to the present invention, a ladle bogie on rails laid in parallel with an extension of a line connecting the furnace center G and the tapping trough is remote-controlled for forward movement, backward movement and stoppage at any position on the rails. This bogie supports the ladle in such a fashion that the latter can be tilted through the medium of its trunnion shaft. When receiving molten steel, the ladle is tilted by lifting its bottom at the side which is farther from the furnace center G. The ladle on the bogie is preheated at such a position that it does not interfere with the molten steel receiving work of the ladle bogie, so that fireproof material inside the ladle is kept preheated until such time that tapping is going to start, then the ladle bodie makes a straight advance to the molten steel receiving position in a very short time, thereby preventing lowering of the temperature of fireproof material inside the ladle. Moreover, the length of the tapping trough is made short to reduce the lowering of the molten steel temperature while the molten steel is passing through the trough of nearly normal temperature. Thus, the present invention is characterized in that it reduces the lowering of the molten steel temperature and any loss of heat during tapping, and reduces the tapping temperature to the minimum possible, with a resultant savings of heat energy, and a shortening of the time required for finishing the process ranging from the ladle preheating to the molten steel receiving.

The nature and advantage of the present invention will be understood more clearly from the following description made with reference to the accompanying drawings, in which.

Figure 1A:
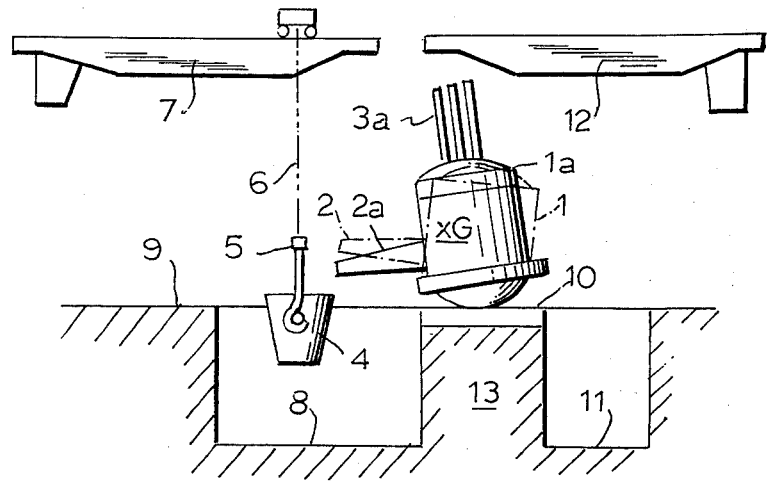
FIG. 1A and FIG. 1B are diagrams of the above-mentioned conventional method of receiving molten steel.
Figure 1B:
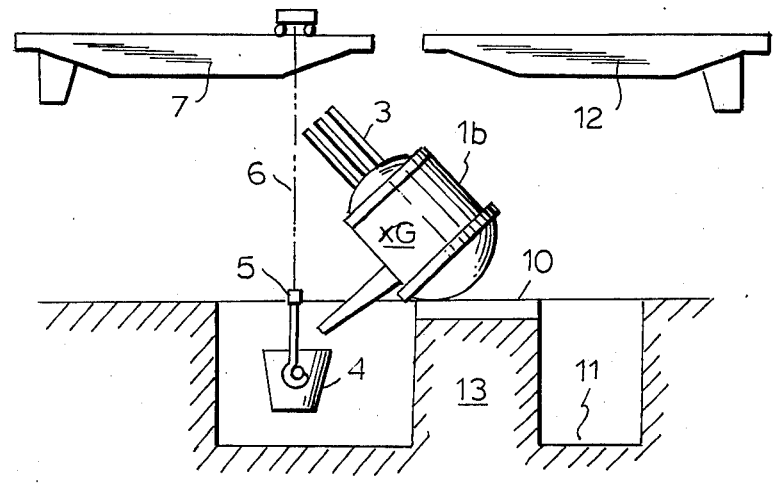
Figure 2A:
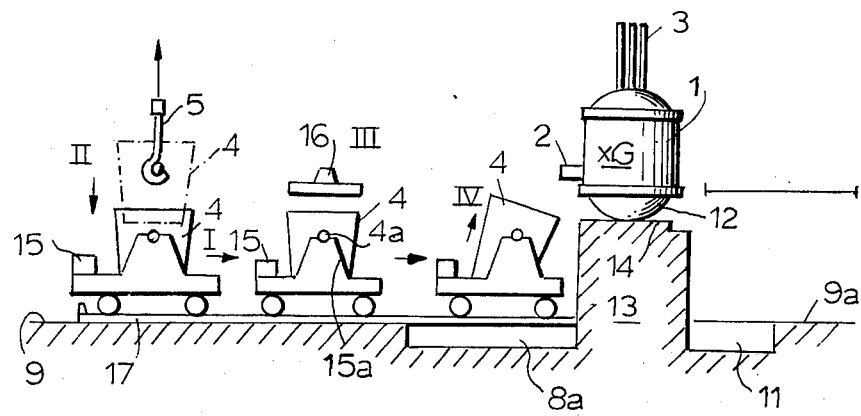
FIG. 2A and FIG. 2B are diagrams showing an outline of the method of receiving molten steel according to the present invention.

In FIG. 2A, rails 17 are laid parallel with a extension of a line connecting the furnace center G of the electric furnace 1 and the tapping trough 2. On the rails, a ladle bogie 15 is mounted in such a fashion that it moves forwardly and backwardly and stops at any position on the rails by the remote-control system. This bogie 15 is provided with a pair of bearings to receive the ends of the trunnion shaft 4a of the ladle 4 so as to support the ladle. This bogie 15 is also provided with a ladle tilting device whereby the ladle 4 on the bogie 15 can be tilted by lifting the bottom of the ladle at the side farther from the furnace center G. A ladle preheating device 16 is arranged above the rails in such a position that it does not interfere with the molten steel receiving work in order to keep the fireproofing material in the ladle preheated until such time as the tapping is going to start. When receiving molten steel, the ladle bogie 15 reaches the molten steel receiving position in a very short time, thereby checking the lowering of the temperature of the fireproof material in the ladle. Moreover, the tapping through 2 is made short in length so as to reduce the lowering of the molten steel temperature while the molten steel is passing through the tapping trough 2. Thus, the present invention has for objectives: the reduction of the lowering of the molten steel temperature and the loss of heat during tapping; reduction of the tapping temperature to the minimum possible, with a resultant saving of heat energy; the shortening of the time required for finishing the process ranging from the ladle preheating to the molten steel receiving; and the elimination of the ladle crane when receiving molten steel into the ladle 4.

Figure 2B:
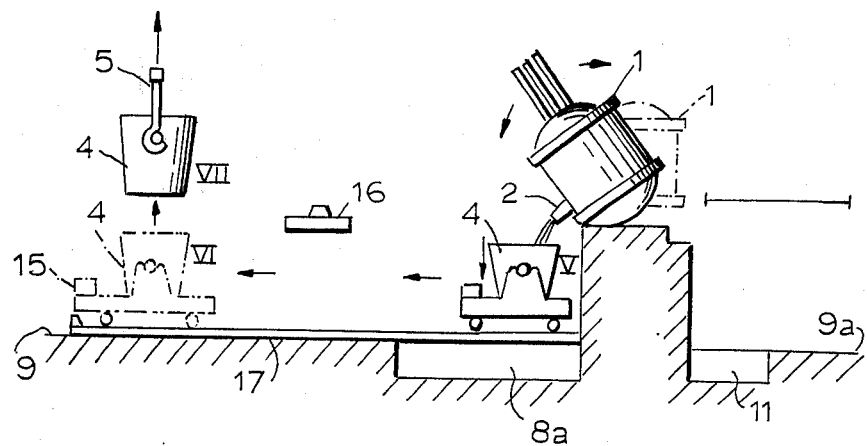

In FIG. 2A and FIG. 2B, each showing a embodiment of the present invention, rails 17 are laid parallel with an extension of a line connecting the furnace center G of the electric furnace 1 and the tapping trough 2. On the rails, a bogie for mounting thereon a ladle is provided in such a fashion that it is remote-controlled mechanically or electrically. Bearings 15a, 15a to support the center shaft (trunnion shaft) 4a of the ladle 4 are provided on both sides of the bogie 15. The foundation 13 having a lower rocker 14 is provided at the floor surface 9. This foundation 13 is sandwiched between a ladle pit 8a at the front part and the slag pit 11 at the rear part. The above-mentioned rails 17 are laid in front of the foundation 13.

Figure 3:
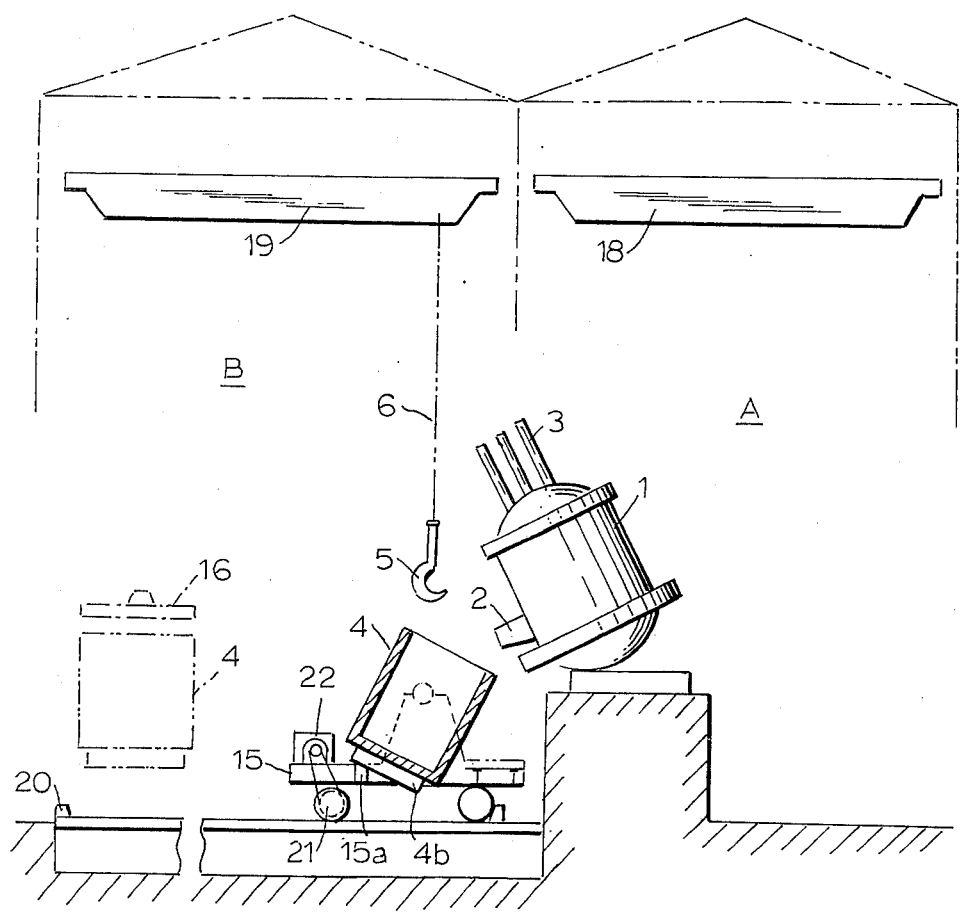
FIG. 3 shows a embodiment of the present invention.

The preheating device 16 is provided intermediate between the front ends of the rails and the foundation 13. This preheating device, which utilizes a conventional heating mechanism, radiates heat downwardly to preheat the heat-insulating surface of an empty ladle 4 which is stopped temporarily thereunder. FIG. 2A shows the state in which the electric furnace is in operation for smelting, and wherein the empty ladle suspended from the hook of the ladle crane is lowered onto the ladle bogie (from the position I shown by a chain line to the position II shown by a solid line and the ladle crane is then transferred to other work). The ladle bogie carrying the empty ladle thereon advances as indicated by an arrow to the position below the preheating device 16 (the position III), whereby the inside of the ladle is kept heated well until tapping is going to start, and then the ladle bogie is advanced immediately below the electric furnace (the position IV). Tilting and restoration of the electric furnace should preferably be operated by the remotecontrol system. The tapping trough 2 is made very short in length to reduce heat radiation in the trough. The ladle 4 is tilted at tapping to facilitate receiving of the molten steel therein. The furnace 1 is restored to the almost horizontal state when tapping is nearly finished (the state of V in FIG. 2B). As soon as the restoration of the furnace 1 to the horizontal state is finished, the bogie 15 moves back to its original position or the position from which the ladle is suspended (the position VI). As soon as the tapping is finished and the electric furnace 1 is restored to the horizontal state, the furnace is again charged with material for smelting. The ladle 4 fully loaded with molten steel is lifted and carried to the continuous forging facilities (the position VII). FIG. 3 shows an embodiment of the present invention containing a material yard A and a tapping yard B. A ladle crane 18 and a ladle crane 19 are arranged at the upper parts of the material yard A and the tapping yard B respectively. The rails 17 are short and the ladle 4 is stopped at the position of the preheating device 16, for which a stopper 20 is provided. The ladle 4 is provided at its bottom with a skirt 4b, engaged with a lifting block 15a, for tilting the ladle by a driving electric reduction gear 22 through the medium of a driving wheel 21.

The present invention affords the following advantages.

Since the ladle can be kept preheated on the ladle bogie on the rails prior to tapping from the furnace, the bogie can travel to the position of receiving molten steel in a short time immediately before the start of tapping. Thus, both the time required for the travelling of the bogie and the lowering of temperature of the fireproof material in the ladle are negligible.

Since tapping from the electric furnace can be effected at the lower tapping temperature or at 1,520° – 1,580°C, wearing of the fireproof material in the furnace due to continued high temperature heating can be prevented and, also, energy, such as power and fuel, can be saved.

Fireproof material in the furnace, especially furnace walls and ceiling, can be used longer, with resultant extension of the furnace operating period, savings of furnace repairing expenses, an increase in the frequency of charging, and so on. Also, such trouble as boiling of the molten steel in the furnace can be prevented.

Since the use of a ladle crane is not required during tapping, the crane and the craneman are not affected by any of hot air, flames and smoke coming from molten steel being received. Thus, machines are protected from damage and the craneman is not affected physiologically. Also, during tapping the ladle crane can be appropriated to preform other kinds of work.

By making the length of the tapping trough of the electric furnace shorter (about 1 meter as against the usual 3 meters), the lowering of the molten steel temperature in the ladle can be prevented and at the same time wearing of fireproof material in the trough can be saved to a large extent.

Use of longer electrodes in the electric furnace will save the labour of replacing electrodes. In the conventional method, when the furnace is tilted in tapping, tips of long electrodes contact with the wire and the hook of the ladle crane, and therefore, the length of electrodes used is limited. According to the present invention, long electrodes can be used.

In receiving molten steel by using the ladle bogie according to the present invention, the molten steel receiving can be watched and operated from the side of the work floor, free from any obstacles to visibility due to flames and smoke, and also the operation by a ladle crane to move the ladle in the fumes of heat can be dispensed with.

What is claimed is:
1. A method for transferring molten metal from an electric furnace comprising the steps of:
    positioning a ladle bogie along rails leading to said furnace, said rails being parallel to an extension of a line connecting the furnace center and a tapping trough of said furnace;
    controlling the location of said ladle bogie along said rails by remote control;
    mounting a ladle having trunnion shafts on two opposite sides thereof onto said ladle bogie, said ladle being tiltable about said trunnion shafts and being lined with fireproof material;

advancing said ladle bogie with said ladle thereon to a preheater positioned above and along said rails near said electric furnace;
preheating said ladle on said ladle bogie with said preheater;
advancing said preheated ladle on said ladle bogie on said rails to said electric furnace;
tilting said ladle about said trunnion shaft by lifting the bottom edge thereof opposite said furnace; and
pouring the molten metal in said furnace through said tapping trough into said preheated, tilted ladle, said tapping trough being short enough to prevent substantial heat loss from the molten metal passing therethrough.

* * * * *